United States Patent
Elomari et al.

(10) Patent No.: US 6,821,502 B2
(45) Date of Patent: Nov. 23, 2004

(54) METHOD OF MAKING ALUMINUM-CONTAINING ZEOLITE WITH IFR STRUCTURE

(75) Inventors: Saleh Elomari, Fairfield, CA (US); Stacey Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/170,917

(22) Filed: Jun. 12, 2002

(65) Prior Publication Data

US 2003/0232007 A1 Dec. 18, 2003

(51) Int. Cl.$^7$ .............................................. C01B 39/04
(52) U.S. Cl. ........................ 423/706; 423/708; 423/712
(58) Field of Search ................................ 423/706, 708, 423/712, 713

(56) References Cited

U.S. PATENT DOCUMENTS

| | | | |
|---|---|---|---|
| 4,503,024 A | 3/1985 | Bourgogne et al. | |
| 5,225,179 A | * 7/1993 | Zones et al. | 423/709 |
| 5,340,563 A | 8/1994 | Zones et al. | |
| 5,437,855 A | 8/1995 | Valyocsik | |
| 5,441,721 A | 8/1995 | Valyocsik | |
| 5,653,956 A | 8/1997 | Zones | |
| 6,524,551 B2 | * 2/2003 | Dhingra | 423/706 |

FOREIGN PATENT DOCUMENTS

WO  WO-9829332 A  *  7/1998

OTHER PUBLICATIONS

Baerlocher et al., Atlas of Zeolite Stucture Types, Fifth Edition, 2001.*

* cited by examiner

Primary Examiner—David Sample
(74) Attorney, Agent, or Firm—Richard J. Sheridan

(57) ABSTRACT

Zeolites having the IFR structure and containing aluminum in their crystal structure can be made by preparing a reaction mixture comprising a zeolite which is an active source of aluminum oxide, an active source of alkali metal oxide, an active source of an oxide of a tetravalent element, an organic template selected from the group consisting of a 1-benzyl-4-aza-1-azonia-bicyclo[2.2.2]octane cation and a N-benzyl quinuclidinium cation, and maintaining the reaction mixture under conditions sufficient to form crystals of the zeolite.

15 Claims, No Drawings

METHOD OF MAKING ALUMINUM-CONTAINING ZEOLITE WITH IFR STRUCTURE

BACKGROUND OF THE INVENTION

1. Field of the Invention

The present invention relates to a method for preparing aluminum-containing crystalline zeolites having the IFR structure ("IFR zeolite") using a zeolite as an active source of aluminum oxide.

2. State of the Art

IFR zeolites are known. U.S. Pat. No. 5,437,855, issued Aug. 1, 1995 to Valyocsik, discloses a zeolite, designated "MCM-58", having the IFR structure prepared using a benzylquinuclidinium organic directing agent. However, it does not disclose the use of a zeolite as a source of aluminum for MCM-58. U.S. Pat. No. 5,441,721, issued Aug. 15, 1995 to Valyocsik, also discloses MCM-58, but prepared using a benzyltropanium organic directing agent. Use of a zeolite as the source of aluminum for MCM-58 is not disclosed. It has been discovered that when a zeolite (Na-Y) is used as the source of aluminum and benzyltropanium is used as the structure directing agent, the only zeolite produced was FAU (a starting material). No zeolite with the IFR structure was made (see Comparative Example B below). Both patents are incorporated by reference herein in their entirety. U.S. Pat. No. 5,653,956, issued Aug. 5, 1997 to Zones, discloses a zeolite, designated SSZ-42, prepared using an organic templating agent selected from the group consisting of 1-benzyl-4-aza-1-azonia-bicyclo [2.2.2] octane cations and N-benzyl-1-azabicyclo[2.2.2]octane cations. The SSZ-42 may contain oxides of boron, aluminum, gallium, iron or titanium, but at least 50% of those oxides must be boron oxide. Zeolites are disclosed as a possible source of aluminum or boron (see col. 8). In Example 14, an aluminum-containing SSZ-42 is made, but the aluminum is added to the SSZ-42 by post-treatment after the boron-containing SSZ-42 was prepared. Likewise, in Example 16 a boron- and gallium-containing SSZ-42 is made by adding gallium by post-treatment of previously made SSZ-42. In Example 20, an aluminum- and boron-containing (50/50) SSZ-42 is prepared directly using sodium borate as the source of boron and sodium aluminum trihydrate as the source of aluminum. U.S. Pat. No. 5,653,956 is incorporated herein by reference in its entirety.

U.S. Pat. No. 5,340,563, issued Aug. 23, 1994 to Zones et al., discloses an improved method for preparing large pore zeolites. The method involves preparing a reaction mixture containing a source zeolite, an alkali metal, nitrogen containing organic cation, a source of silica and water. The source zeolite contains sodalite substructures and has a tetrahedra atom density of less than about 15 $TO_2$ per 1000 Angstroms$^3$. Examples of zeolites prepared by this method are SSZ-25, SSZ-31, SSZ-37, beta and ZSM-12. Zeolites A, N-A, ZK-4, faujasite, X, Y, ZK-5 and rho are disclosed as source zeolites. U.S. Pat. No. 5,340,563 is incorporated by reference herein in its entirety.

U.S. Pat. No. 4,503,024, issued Mar. 5, 1985 to Bourgogne et al., discloses synthesizing zeolites using zeolites as reactants. It does not, however, disclose the synthesis of a zeolite having the IFR structure.

SUMMARY OF THE INVENTION

In accordance with the present invention there is provided a method for preparing a zeolite having the IFR structure comprising:

(a) preparing a reaction mixture comprising (1) a zeolite which is an active source of aluminum oxide, (2) an active source of alkali metal oxide, (3) an active source of an oxide of a tetravalent element, and (4) an organic template selected from the group consisting of a N-benzyl-1,4-diazabicyclo[2.2.2] octane cation and a N-benzyl quinuclidinium cation, wherein said reaction mixture has a composition in terms of mole ratios of oxides falling within the following ranges:

$YO_2/Al_2O_3$ about 5 to about 100
$OH^-/YO_2$ about 0.05 to about 0.50
$Q/YO_2$ about 0.10 to about 1.0
$M_{2/n}/YO_2$ about 0.005 to about 0.50
$H_2O/YO_2$ about 3 to about 100
$Q/Q+M_{2/n}$ about 0.50 to about 0.95 wherein Y is silicon, germanium or mixtures thereof, Q is an 1-benzyl-4-aza-1-azonia bicyclo[2.2.2]octane cation or N-benzyl quinuclidinium cation, M is an alkali metal cation or alkaline earth metal cation and n is the valence of M; and (b) maintaining the reaction mixture under conditions sufficient to form crystals of the IFR zeolite.

Also provided in accordance with the present invention is an essentially boron-free zeolite having a composition, as synthesized and in the anhydrous state, in terms of mole ratios as follows:

$YO_2/Al_2O_3$ about 5 to about 100
$OH^{31}/YO_2$ about 0.05 to about 0.50
$Z/YO_2$ about 0.10 to about 1.0
$M_{2/n}/YO_2$ about 0.005 to about 0.50
$H_2O/YO_2$ about 3 to about 100
$Z/Z+M_{2/n}$ about 0.50 to about 0.95 wherein Y, M and n are as defined above and Z is a 1-benzyl-4-aza-1-azonia bicyclo[2.2.2]octane cation.

Further provided in accordance with the present invention is a zeolite having the IFR crystal structure and having a composition, as synthesized and in the anhydrous state, in terms of mole ratios as follows:

$YO_2/Al_2O_3$ about 5 to about 100
$YO_2/B_2O_3$ about 5 to about 100
$OH^-/YO_2$ about 0.05 to about 0.50
$Z/YO_2$ about 0.10 to about 1.0
$M_{2/n}/YO_2$ about 0.005 to about 0.50
$H_2O/YO_2$ about 3 to about 100
$Z/Z+M_{2/n}$ about 0.50 to about 0.95 wherein Y, M, and n are as defined above and Z is a 1-benzyl-4-aza-1-azonia-bicyclo[2.2.2]octane cation and wherein the amount of aluminum is greater than the amount of boron.

DETAILED DESCRIPTION OF THE INVENTION

Zeolites having the IFR structure are those which, after calcination, have a crystalline structure whose X-ray powder diffraction pattern includes the characteristic lines shown in Table I below:

TABLE I

| CALCINED IFR ZEOLITE | | |
|---|---|---|
| 2 Theta | d/n | Relative Intensity[a] |
| 8.22 | 10.75 | VS |
| 9.76 | 9.06 | W |

TABLE I-continued

CALCINED IFR ZEOLITE

| 2 Theta | d/n | Relative Intensity[a] |
|---|---|---|
| 16.42 | 5.394 | W |
| 19.22 | 4.615 | W |
| 20.48 | 4.333 | M |
| 20.84 | 4.259 | M |
| 21.48 | 4.134 | W |
| 21.72 | 4.088 | W-M |
| 23.68 | 3.754 | W |
| 24.06 | 3.696 | W |
| 24.94 | 3.568 | W |
| 25.40 | 3.504 | W |
| 26.60 | 3.348 | M |
| 29.56 | 3.019 | W |

[a]The X-ray pattern is based on a relative intensity scale in which the strongest line in the X-ray pattern is assigned a value of 100: W (weak) is less than 20; M (medium) is between 20 and 40; S (strong) is between 40 and 60; and VS (very strong) is greater than 60.

The variation in the scattering angle (two theta) measurements, due to instrument error and to differences between individual samples, is estimated at +/− 0.20 degrees.

The IFR zeolites prepared in accordance with this invention will typically have a silica to alumina mole ratio of about 20 to about 80.

IFR zeolites can be prepared from an aqueous solution comprising sources of an alkali metal oxide, the templating agent, an active source(s) of desired tetravalent element oxide(s), and an active source(s) of aluminum oxide. The reaction mixture should have a composition, in terms of mole ratios, within the ranges shown in Table A.

TABLE A

IFR ZEOLITE REACTION MIXTURE

| | Broad | Preferred |
|---|---|---|
| $YO_2/Al_2O_3$ | 5 and greater (to about 100) | 15 and greater (to about 100) |
| $OH^-/YO_2$ | 0.05 to 0.50 | 0.15 to 0.30 |
| $Q/YO_2$ | 0.10 to 1.0 | 0.10 to 0.25 |
| $M_{2/n}/YO_2$ | 0.005 to 0.50 | 0.03 to 0.10 |
| $H_2O/YO_2$ | 3 to 100 | 20 to 50 |
| $Q/Q + M_{2/n}$ | 0.50 to 0.95 | 0.66 to 0.90 | wherein Y is selected from the group consisting of silicon, germanium, and mixtures thereof, Q is comprised of 1-benzyl-4-aza-1-azonia-bicyclo[2.2.2]octane cations or N-benzyl quinuclidinium cations, M is an alkali metal cation or alkaline earth metal cation and n is the valence of M.

In practice, aluminum-containing IFR zeolites are prepared by a process comprising:

(a) preparing an aqueous solution containing sources of the oxides listed in Table A above, wherein the source of aluminum is an aluminum-containing zeolite, and a 1-benzyl-4-aza-1-azonia-bicyclo[2.2.2]octane cation or benzyltropanium cation templating agent having an anionic counterion which is not detrimental to the formation of the IFR zeolite;

(b) maintaining the aqueous solution under conditions sufficient to form crystals of IFR zeolite; and (c) recovering the crystals of the IFR zeolite.

The 1-benzyl-4-aza-1-azonia-bicyclo[2.2.2]octane cation templating agent has the following general formula:

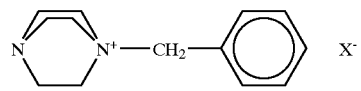

The anion ($X^-$) associated with the cation may be any anion which is not detrimental to the formation of the zeolite. Representative anions include halide, e.g., fluoride, chloride, bromide and iodide, hydroxide, acetate, sulfate, tetrafluoroborate, carboxylate, and the like. Hydroxide is the most preferred anion.

The N-benzyl-1,4-diazabicyclo[2.2.2]octane cation ("benzyl DABCO") templating agent has the advantage that it is less expensive than the benzylquinuclidinium organic directing agent of U.S. Pat. No. 5,437,855 and the benzyltropanium organic directing agent of U.S. Pat. No. 5,441,721. However, it has been found that aluminosilicate IFR zeolites can not be made directly using conventional sources of alumina, such as sodium aluminate (see Comparative Example A below) when benzyl DABCO is used as the templating agent. Rather, when benzyl DABCO is used with such a conventional source of alumina, a different zeolite results. Instead, a borosilicate IFR zeolite has to be prepared first, followed by exchange of the boron for aluminum. By using the source zeolites of this invention, aluminosilicate IFR zeolites can be directly prepared using benzyl DABCO as the templating agent, resulting in significant cost savings.

The N-benzyl quinuclidinium cation templating agent has the following formula:

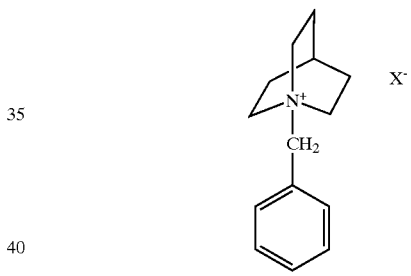

where $X^-$ is as defined above.

The reaction mixture used to prepare the IFR zeolites may also contain an active source of boron oxide, such as boric acid. When the boron source is present it is generally used in a $YO_2/B_2O_3$ mole ratio of about 5 to about 100, preferably from about 20 to about 100, where $YO_2$ is defined above.

Typical sources of silicon oxide include silicates, silica hydrogel, silicic acid, fumed silica, colloidal silica, tetra-alkyl orthosilicates, and silica hydroxides.

A zeolite reagent provides the source of aluminum for the IFR zeolite. In some cases, the source zeolite may provide a source of silica. Use of a source zeolite reagent as a source of alumina is described in aforementioned U.S. Pat. No. 5,340,563.

The term "source zeolite" as used herein means an aluminosilicate zeolite used as a reactant in a reaction mixture to produce a zeolite having the IFR structure. The source zeolite used in accordance with this invention contains sodalite substructures and has a tetrahedra atom density of less than about 15 $TO_2/1000$ Angstroms$^3$ ($TO_2$ representing the tetrahedral oxides in the crystal structure). Preferably, the source zeolite is zeolite A, N-A, ZK-4, faujasite, X, Y, ZK-5 or rho. The silica to alumina mole ratio in these source zeolite should be from about 2 to about 20. Preferably, the silica to alumina mole ratio in these source zeolites should be from about 2 to about 10, and most preferably from about 2 to about 5.

The term "sodalite substructures" as used herein means a truncated octahedron having 36 edges, 24 vertices, six square faces, and eight hexagonal faces with a tetrahedral atom located at each vertex. Oxygen atoms are located between the tetrahedral atoms, but not necessarily on the edge.

Tetrahedra atom densities for various zeolitic structures is given in more detail in "Zeolite Molecular Sieves" by D. W. Breck (1984), the disclosure of which is incorporated by reference herein.

The use of source zeolites having sodalite structures and which have a tetrahedra atom density of less than about 15 $TO_2/1000$ Angstroms$^3$ allows a relatively smaller concentration of the organic template to be present in the reaction mixture. Because one can use lower amounts of the template, and because the source zeolite can be used in the ammonium form as well as the alkali metal form, preferably as the sodium form or mixtures of ammonium and sodium forms, lower cost zeolites may be obtained.

Zeolite A and the conventional preparation thereof is described in U.S. Pat. No. 2,882,243. Zeolite N-A and the conventional preparation thereof is described in U.S. Pat. No. 3,306,922. Zeolite ZK-4 and the conventional preparation thereof is described in U.S. Pat. No. 3,247,195. Zeolite X and the conventional preparation thereof is described in U.S. Pat. No. 2,882,244. Zeolite Y and the conventional preparation thereof is described in U.S. Pat. No. 3,130,007. Zeolite ZK-5 and the conventional preparation thereof is described in U.S. Pat. No. 3,247,195. Zeolite rho and the conventional preparation thereof is described in U.S. Pat. No. 3,904,738. The disclosures of these patents are incorporated by reference herein in their entirety.

Typically, an alkali metal hydroxide, such as the hydroxide of sodium, potassium, lithium, or cesium is used in the reaction mixture; however, this component can be omitted so long as the equivalent basicity is maintained. The templating agent may be used to provide hydroxide ion. Thus, it may be beneficial to ion exchange, for example, a hydroxide anion for a halide ion in the templating agent, thereby reducing or eliminating the alkali metal hydroxide quantity required. The alkali metal cation may be part of the as-synthesized crystalline oxide material, in order to balance valence electron charges therein.

The reaction mixture is maintained at an elevated temperature until the crystals of the zeolite are formed. This hydrothermal crystallization is usually conducted under autogenous pressure, at a temperature between 100° C. (212° F.) and 200° C. (392° F.), preferably between 135° C. (275° F.) and 180° C. (356° F.). The crystallization period is typically greater than 1 day and preferably from about 3 days to about 7 days. The zeolite can be prepared with or without mild stirring or agitation.

During the hydrothermal crystallization step, the IFR zeolite crystals can be allowed to nucleate spontaneously from the reaction mixture. However, the use of IFR zeolite crystals as seed material can be advantageous in decreasing the time necessary for complete crystallization to occur. In addition, seeding can lead to an increased purity of the product obtained by promoting the nucleation and/or formation of IFR zeolite over any undesired phases. When used as seeds, IFR zeolite crystals are added in an amount sufficient to direct and/or accelerate crystallization, i.e., typically between about 0.1 and about 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. (194° F.) to 150° C. (302° F.) for from 8 to 24 hours, to obtain the as-synthesized, IFR zeolite crystals. The drying step can be performed at atmospheric pressure or under vacuum.

Aluminum-containing IFR zeolites are useful in hydrocarbon conversion reactions. Hydrocarbon conversion reactions are chemical and catalytic processes in which carbon containing compounds are changed to different carbon containing compounds. Examples of hydrocarbon conversion reactions in which these zeolites are expected to be useful include catalytic cracking, hydrocracking, dewaxing, alkylation, and olefin and aromatics formation reactions.

A primary advantage of the present invention is that aluminum-containing IFR zeolites can be made directly, i.e., there is no need to first prepare a boron-containing IFR zeolite and then substitute aluminum for the boron in the zeolite. Thus, the present invention provides as-synthesized, aluminum-containing, essentially boron-free IFR zeolites that contain the N-benzyl-1,4-diazabicyclo[2.2.2] octane cation organic template. As used in this context, the term "essentially boron-free" means that the as-synthesized zeolite contains less than about 500 ppm.

The present invention also provides a zeolite having the IFR crystal structure in the as-synthesized state (i.e., prior to removal of the organic template from the zeolite) that contains both aluminum and boron. In this case, the amount of aluminum contained in the crystal structure is greater than the amount of boron contained in the crystal structure. In other words, of the combined amount of aluminum and boron in the crystal structure, less than 50%, preferably less than 30%, is boron.

EXAMPLES

The following examples demonstrate but do not limit the present invention.

Example 1

Synthesis of 1-benzyl-4-aza-1-azonia-bicyclo[2.2.2] octane Cation

145 Grams of 1,4-diazabicyclo[2.2.2]octane (commonly referred to as "DABCO") is dissolved in 2.5 liters of ethyl acetate and chilled to 0° C. (32° F.). 209 Grams of benzyl bromide is added dropwise while the chilled solution is stirred. Caution should be exercised because the reaction is rapid and requires cooling. The product is collected by filtration and recrystallized from a minimum of warm methanol. The recrystallized product gives a microanalysis and NMR pattern consistent with the 1:1 adduct. The quaternary ammonium compound is ion exchanged using hydroxide exchange resin AG 1-X8 from BioRad. The exchanged solution is titrated for molarity and the yield of exchange is greater than 90%. The resulting compound is designated Template A.

Example 2

Synthesis of IFR Zeolite 2.0 Millimoles of Template A is combined with 2.0 millimoles of NaOH in 8 cc water. 0.28 Grams of Y zeolite (LZY-52 from Union Carbide Corporation, $SiO_2/Al_2O_3$ mole ratio near 5) is added in as well as 0.72 grams of CAB-O-SIL M-5, a fumed silica. The reaction mixture is heated in the Teflon cup of a 23 ml volume Parr digestion bomb, rotating on a spit at 43 RPM while being heated to 160° C. The reaction is heated for 6 days under these conditions and then cooled. The pH having risen within the reactor to greater than 12, it is deemed that organozeolite product has formed. The product is collected by filtration, given subsequent washing and drying and then analyzed by X-ray diffraction. The product is an IFR zeolite with an X-ray pattern consistent with Table I above. The product contains a $SiO_2/Al_2O_3$ mole ratio (SAR) of 35 as determined by wet chemical methods.

Examples 3–17

Synthesis of IFR Zeolite

In the following examples the SAR is varied in the runs by using the conditions of Example 2, and either increasing or decreasing the quantity of CAB-O-SIL. The conditions and XRD data results are given in Table B.

TABLE B

VARIATION IN SAR

| EX. NO. | REACTANT SAR | XRD PRODUCT(S) |
|---|---|---|
| 3 | 20 | IFR zeolite and some unreacted LZY-52 |
| 4 | 24 | IFR zeolite and some LZY-52 |
| 5 | 28 | IFR zeolite and a little remaining LZY52 |
| 6 | 32 | IFR zeolite |
| 7 | 36 (Ex. 2) | IFR zeolite |
| 8 | 40 | IFR zeolite |
| 9 | 44 | IFR zeolite |
| 10 | 47 | IFR zeolite |
| 11 | 50 | IFR zeolite |
| 12 | 60 | IFR zeolite |
| 13 | 64 | IFR zeolite |
| 14 | 72 | IFR zeolite |
| 15 | 80 | IFR zeolite and a trace of ZSM- 12 |
| 16 | 90 | IFR zeolite and a trace of ZSM-12 |
| 17 | 100 | ZSM-12 and LZY-52 |

Examples 18–20

Synthesis of Aluminoborosilicate IFR Zeolite

In the following reactions, the procedure is used as in Example 2 except variable amounts of boron, as sodium borate, are added to provide an IFR zeolite product containing both boron and aluminum substituted into the lattice. Table C below shows the ratios of boron and aluminum and the corresponding zeolite product(s).

TABLE C

| Ex. No. | Al/ B ratio in reaction | Product(s) |
|---|---|---|
| 18 | 1 (50/50) | IFR zeolite & trace of beta |
| 19 | 2 (66/33) | IFR zeolite & trace of beta |
| 20 | 4 (80/20) | IFR zeolite & a little LZY-52 |

Example 21

Micropore Volume

One of the advantages of this synthetic method is the production of an active aluminosilicate or aluminoborosilicate zeolite material with a high micropore volume, conducive to higher catalytic activity. The product of Example 2 is calcined to 1100° F. (593° C.), in stages and under a stream of nitrogen with a very small air bleed. The stages to 125° C. (257° F.) at 50° C. (122° F.)/hr, hold for two hours, 50° C. (122° F.)/hr to 540° C. (1004° F.), hold for four hours, 50° C. (122° F.)/hr to 593° C. (1100° F.) with a final hold for four hours. The calcined material is then ion-exchanged twice with ammonium nitrate, followed by a washing and drying step. The micropore volume, determined by use of nitrogen as adsorbate, is found to be 0.20 cc/gm. This value matches that found for the calcined IFR borosilicate zeolite SSZ-42 (see Example 12 in U.S. Pat. No. 5,653,956), and is in good agreement with the value expected from the structure determination for SSZ-42 (Chen et al., J. Chem. Soc. Chem. Comm., pg. 1775, 1997). This demonstrates that there is no pore blockage for this product.

Example 22

Constraint Index

The utility of the product material can be seen by subjecting the product of Example 21 to a catalytic cracking experiment using the Constraint Index determination. 0.50 Gram of 20–40 mesh granules (after pelletization to 3000 psi and pellet breakup) of the product of Example 21 is packed into a ¼ inch stainless steel reactor tube with alundum on both sides of the zeolite bed. The reactor is placed in a Lindburg furnace and heated to 540° C. (1004° F.) for drying. At 125° C. (257° F.) helium is introduced into the reactor at 10 cc/minute and atmospheric pressure. The temperature is gradually raised to 288° C. (550° F.) over 40 minutes. Feed is introduced by means of a syringe pump at a rate of 0.62 cc/hr of a 50/50 (v/v) mixture of n-hexane and 3-methylpentane. Direct sampling onto a gas chromatograph is begun at ten minutes.

This material gives a C.I. conversion of 93% at 10 minutes on-stream at a low temperature of 550° F. (288° C.). This activity compares favorably with the activity of the very strong acid zeolite catalysts, beta and SSZ-26.

Example 23

Larger Scale Synthesis of IFR Zeolite

605 Milliliters of 0.93M aqueous solution of Template A (562 mmol of Template A), 375 ml of 1.0 N aqueous solution of NaOH (375 mmol of NaOH), 1000 ml of water (total water=102.23 mmol), 201 grams of CAB-O-SIL M-5 silica (3.283 moles silica) and 64.5 grams LZY-52 zeolite (0.5 mole silica, 0.218 mole Al, 0.218 mole Na, 0.9 mole water) are all mixed in a 1-gallon steel liner (the reagents are listed in order of mixing). To the resulting gel, small amounts (on the order of 1.5 or 3 weight percent based on the weight of the silica) of aluminum-containing IFR zeolite crystals are added as seeds. The gel is then heated in an autoclave at 160° C. at 100 rpm for 120 hours. When 1.5 wt. % of seeds is used, the resulting product contains IFR zeolite as the major crystallization product, with beta zeolite as a minor impurity and a trace amount of MOR. When 3 wt. % seeds is used, IFR zeolite is obtained with only a trace amount of MOR.

Example 24

Synthesis of IFR Zeolite Using Na-X Zeolite 2.42 ml of 0.93 M solution of benzyl DABCO hydroxide (2.25 mmol of benzyl DABCO), 1.5 gm of 1.0 N sodium hydroxide solution and enough de-ionized water to reach a total weight of 7.4 gm are added to a 23 cc Teflon liner. To the resulting mixture is added 0.175 gm of Na-X zeolite (Al/Si=1), and 0.86 gm of CAB-O-SIL M-5 silica. The resulting gel is placed in a steel reactor and heated at 160°

C. while being tumbled at 43 rpm. After heating and tumbling for six days, the reaction is complete. The resulting mixture (a solution with settled fine solids) is filtered and the solids are washed with deionized water several times, and then air dried overnight. The reaction yields 0.95 gm of a zeolite having the IFR structure, with a small amount of Gismondine (P zeolite) impurity, as indicated by X-ray diffraction analysis.

Example 25

Synthesis of IFR Zeolite Using Na-A Zeolite 2.42 ml of 0.93 M solution of benzyl DABCO hydroxide (2.25 mmol of benzyl DABCO), 1.5 gm of 1.0 N sodium hydroxide solution and enough de-ionized water to reach a total weight of 7.4 gm are added to a 23 cc Teflon liner. To the resulting mixture is added 0.175 gm of Na-A zeolite (Al/Si=1), and 0.86 gm of CAB-O-SIL M-5 silica. The resulting gel is placed in a steel reactor and heated at 160° C. while being tumbled at 43 rpm. After heating and tumbling for six days, the reaction is complete. The resulting mixture (a solution with settled fine solids) is filtered and the solids are washed with deionized water several times, and then air dried overnight. The reaction yields 1.0 gm of a zeolite having the IFR structure, with a trace amount of Gismondine (P zeolite) impurity, as indicated by X-ray diffraction analysis.

Example 26

Synthesis of IFR Zeolite Using N-Benzyl Quinuclidinium Cation

In a 23 cc. Teflon liner is placed 4.75 ml. of 0.475M solution of N-benzyl quinuclidinium hydroxide (2.25 mmol. N-benzyl quinuclidinium hydroxide), 1.5 g. of 1N sodium hydroxide. Water is added until a total weight of 7.36 g. is reached. To the resulting solution is added 0.26 g. of LZY-52 zeolite, and 0.81 g. of CAB-O-SIL M-5 fumed silica. The resulting gel is sealed in the Teflon liner and placed in a steel Parr reactor and heated in an oven at 160° C. while rotating at 43 rpm. The reaction is monitored by following the change in the pH of the reaction mixture and by Scanning Electron Microscopy. The reaction requires 12 days to complete. The reaction mixture is then filtered and the obtained solid material is washed several times with deionized water and air-dried over night. The reaction yields 1.1 g. of a mixture of an IFR zeolite and a FAU zeolite (the starting reagent), as determined by X-ray diffraction analysis.

Comparative Example A

Use of Benzyl DABCO and Sodium Aluminate 2.42 Ml of 0.93 M solution of benzyl DABCO hydroxide (2.25 mmol of benzyl DABCO), 1.5 gm of 1.0 N sodium hydroxide solution and enough de-ionized water to reach a total weight of 7.38 gm are added to a 23 cc Teflon liner. To the resulting mixture is added 0.0734 gm of sodium aluminate (containing 17.27% water by weight), and 0.91 gm of CAB-O-SIL M-5 silica. The resulting gel is placed in a steel reactor and heated at 160° C. while being tumbled at 43 rpm. After heating and tumbling for 12 days, the reaction is complete. The resulting mixture (a solution with settled solids) is filtered and the solids are washed with deionized water several times, and then air dried overnight. The reaction yields 1.1 gm of a beta zeolite, as indicated by X-ray diffraction analysis. No zeolite having the IFR structure is observed.

Comparative Example B

Use of Benzyl Tropanium Cation

In a 23 cc. Teflon liner is placed 4 ml. of 0.57M solution of N-benzyl tropanium hydroxide (2.25 mmol. N-benzyltropanium hydroxide), 1.5 g. of 1N sodium hydroxide. Water is added until a total weight of 7.4 g. is reached. To the resulting solution is added 0.26 g. of LZY-52 zeolite and 0.81 g. of CAB-O-SIL M-5 fumed silica is added. The resulting gel is sealed in the Teflon liner and placed in a steel Parr reactor and heated in an oven at 160° C. while rotating at 43 rpm. The reaction is monitored by following the change in the pH of the reaction mixture and by Scanning Electron Microscopy. After heating for 24 days the reaction mixture is filtered and the obtained solid material is washed several times with deionized water and air-dried over night. The reaction yields 1.0 g. of amorphous material, FAU zeolite (starting reagent), and a trace of layered material, as determined by X-ray diffraction analysis. No IFR zeolite is observed.

Comparative Example C

Use of N-Benzyl Tropanium Cation and Sodium Borate

In a 23 cc. Teflon liner is placed 5.25 ml. of 0.57M solution of N-benzyl tropanium hydroxide (3 mmol. N-benzyl tropanium hydroxide), 1.2 g. of 1N sodium hydroxide. Water is added until a total weight of 12 g. is reached. To the resulting mixture is added 0.06 g. of sodium borate decahydrate, and the mixture is stirred until the sodium borate dissolves. Finally, 0.9 g. of CAB-O-SIL M-5 fumed silica is added. The resulting gel is sealed in the Teflon liner and placed in a steel Parr reactor and heated in an oven at 160° C. while rotating at 43 rpm. The reaction is monitored by following the change in the pH of the reaction mixture and by Scanning Electron Microscopy. The reaction requires 18 days to complete. The reaction mixture is then filtered and the obtained solid material is washed several times with deionized water and air-dried over night. The reaction yields 0.8 g. of a boron-containing IFR zeolite and a trace amount of layered material, as determined by X-ray diffraction analysis.

Comparative Example D

Use of Aluminum Sulfate as the Aluminum Source

In a 23 cc Teflon liner is placed 5.22 ml of 0.93M solution of benzyl DABCO-OH (4.85 mmol of benzyl DABCO), and 1.5 gm of 1.0N sodium hydroxide solution. De-ionized water is added until the total weight reaches 7.36 gm. To this mixture, 0.293 GM of aluminum sulfate octadecahydrate ($Al_2(SO_4)_3$ $18H_2O$) and 0.91 gm of CAB-O-SIL-M-5 are added. The resulting gel is placed in a steel reactor and heated at 160° C. and tumbling at 43 rpm. After heating and tumbling for 12 days, the reaction is complete. The resulting mixture (a solution with settled solids) is filtered and the solids are washed with de-ionized water several times and then dried in an oven at 120° C. for 30 minutes. The reaction yields 1 gm of BETA zeolite as indicated by XRD analysis. No IFR zeolite is observed. (Organic/Si=0.32; Al/Si=0.059; Na/Si=0.15; OH/Si=0.25: $H_2O$/Si=27). In this reaction protons are generated due to the use of aluminum sulfate as an aluminum source. The amount of hydroxide takes into account hydroxide lost from balancing the protons from the aluminum sulfate. To account for the consumed hydroxide by the generated protons and to keep the OH/Si ratio in the desired range, more of the organic template is added as the hydroxide source. In comparison, when the extra hydroxide is added in the form of NaOH, the reaction mixture remains as a gel after heating for five weeks.

What is claimed is:

1. A method for preparing a zeolite having the IFR structure comprising:

(a) preparing a reaction mixture comprising (1) a zeolite which is an active source of aluminum oxide, (2) an active source of alkali metal oxide, (3) an active source of an oxide of a tetravalent element, and (4) an organic template selected from the group consisting of a 1-benzyl-4-aza-1-azonia-bicyclo[2.2.2]octane cation and a N-benzyl quinuclidinium cation, wherein said reaction mixture has a composition in terms of mole ratios of oxides falling within the following ranges:

$YO_2/Al_2O_3$ about 5 to about 100
   $OH^-/YO_2$ about 0.05 to about 0.50
   $Q/YO_2$ about 0.10 to about 1.0
   $M_{2/n}/YO_2$ about 0.005 to about 0.50
   $H_2O/YO_2$ about 3 to about 100
   $Q/Q+M_{2/n}$ about 0.50 to about 0.95 wherein Y is silicon, germanium or mixtures thereof, Q is an 1-benzyl-4-aza-1-azonia-bicyclo[2.2.2]octane cation or N-benzyl quinuclidinium cation, M is an alkali metal cation or alkaline earth metal cation and n is the valence of M; and (b) maintaining the reaction mixture under conditions sufficient to form crystals of the IFR zeolite.

2. The method of claim 1 wherein the reaction mixture has the following composition:

$YO_2/Al_2O_3$ about 15 to about 100
   $OH-/YO_2$ about 0.15 to about 0.30
   $Q/YO_2$ about 0.10 to about 0.25
   $M_{2/n}/YO_2$ about 0.03 to about 0.10
   $H_2O/YO_2$ about 20 to about 50
   $Q/Q+M_{2/n}$ about 0.66 to about 0.90.

3. The method of claim 1 wherein the reaction mixture further comprises an active source of boron oxide in a mole ratio of oxides of about 5 to about 100 $YO_2/B_2O_3$ and the amount of boron is less than the amount of aluminum.

4. The method of claim 2 wherein the reaction mixture further comprises an active source of boron oxide in a mole ratio of oxides of about 5 to about 100 $YO_2/B_2O_3$ and the amount of boron is less than the amount of aluminum.

5. The method of claim 1 wherein the active source of aluminum oxide is a zeolite that contains sodalite substructures and has a tetrahedra atom density of less than about 15 $TO_2/1000$ Angstroms$^3$.

6. The method of claim 1 wherein the active source of aluminum oxide is Y zeolite in the sodium form.

7. The method of claim 1 wherein the active source of aluminum oxide is zeolite A in the sodium form.

8. The method of claim 1 wherein the active source of aluminum oxide is zeolite N-A in the sodium form.

9. The method of claim 1 wherein the active source of aluminum oxide is zeolite ZK-4 in the sodium form.

10. The method of claim 1 wherein the active source of aluminum oxide is faujasite in the sodium form.

11. The method of claim 1 wherein the active source of aluminum oxide is zeolite X in the sodium form.

12. The method of claim 1 wherein the active source of aluminum oxide is zeolite ZK-5 in the sodium form.

13. The method of claim 1 wherein the active source of aluminum oxide is zeolite rho in the sodium form.

14. The method of claim 1 wherein the organic template comprises an 1-benzyl-4-aza-1-azonia-bicyclo[2.2.2]octane cation.

15. The method of claim 1 wherein the organic template comprises an N-benzyl-quinuclidinium cation.

* * * * *